Figure 1:
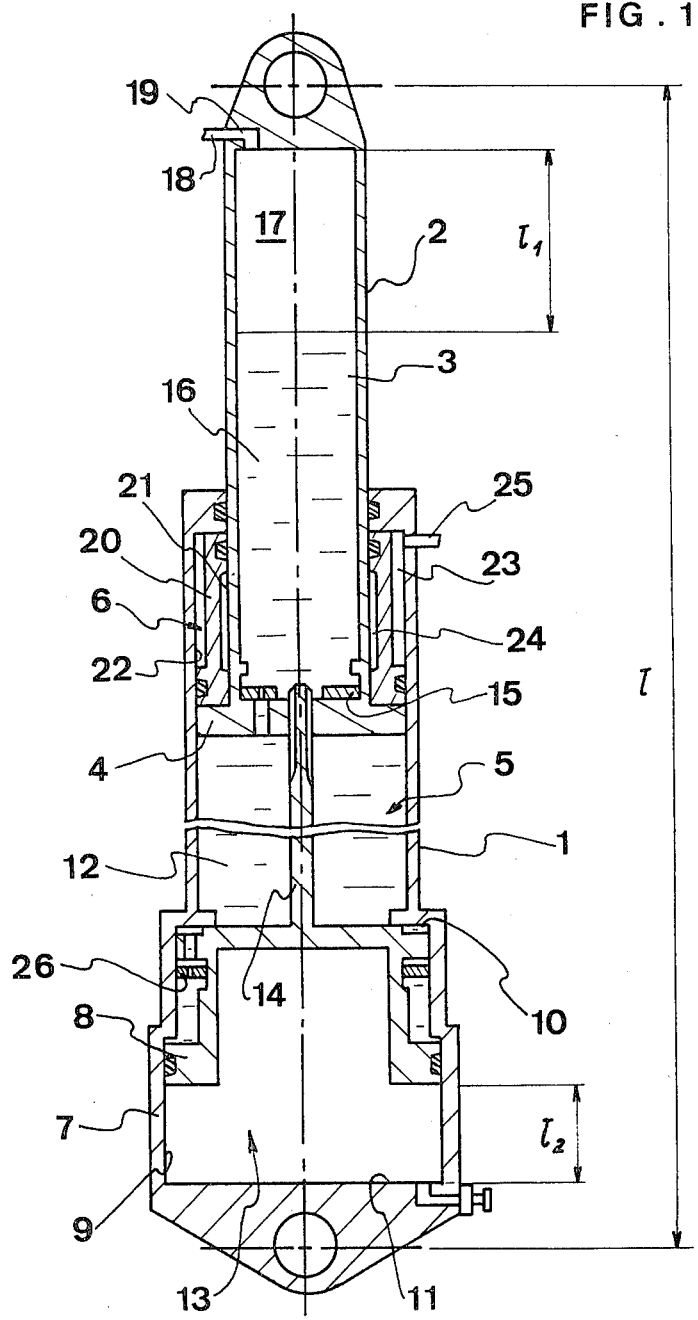

United States Patent [19]

Turiot

[11] 4,445,672
[45] May 1, 1984

[54] SHOCK ABSORBER-ACTUATOR

[75] Inventor: André Turiot, Morsang s/Orge, France

[73] Assignee: Messier-Hispano-Bugatti (S.A.), Montrouge, France

[21] Appl. No.: 316,020

[22] Filed: Oct. 28, 1981

[30] Foreign Application Priority Data

Oct. 30, 1980 [FR] France .................. 80 23190

[51] Int. Cl.³ .................. F16F 9/06; B60G 17/00
[52] U.S. Cl. .................. 267/64.16; 280/708
[58] Field of Search .............. 188/269, 283, 284, 299, 188/317; 267/64.16, 64.25; 280/704, 708, 712

[56] References Cited

U.S. PATENT DOCUMENTS 3,570,832  3/1971  Ortheil .............. 267/64.16

FOREIGN PATENT DOCUMENTS 1430550  8/1963  Fed. Rep. of Germany ... 267/64.16

Primary Examiner—Duane A. Reger
Attorney, Agent, or Firm—Sughrue, Mion, Zinn, Macpeak & Seas

[57] ABSTRACT

The present invention relates to shock absorber-actuators.

The shock absorber-actuator is characterized essentially by the fact that it comprises at least one cylinder (101), a hollow rod (102) sliding in the cylinder (101), a gas chamber (153) delimited by a separating piston (141), and means (140, 156, 154) for positioning this piston between two stops (145, 147).

The shock absorber-actuator finds a particularly advantageous application in aircraft and in particular helicopters.

6 Claims, 2 Drawing Figures

SHOCK ABSORBER-ACTUATOR

The present invention relates to shock absorbers and more particularly to those which make it possible to perform the function of actuator, notably of the type used in aerodyne landing gears, particularly on helicopters, and adapted to emergency landings, i.e. at a speed higher than normal landing speeds.

There are many types of prior-art suspension shock absorbers for aerodyne landing gears, comprising the shock absorber rod mounted slidably with sealing within a first hydraulic fluid chamber of a cylinder, the rod or the cylinder enclosing a low-pressure elastic return chamber, such as a gas chamber under pressure, as well as a hydraulic fluid volume, in certain cases adjacent to the low-pressure chamber and in communication with the first chamber of the cylinder through at least one throttling orifice under compression, delimited for example by a piston carried by the end of the shock absorber rod received inside the cylinder, the expansion of the low-pressure chamber being checked by a throttling expansion valve.

In these devices, the low-pressure chamber acts as a spring, returning the device to the balanced position after the damping of the movement of the rod in the cylinder, which results from energy dissipation by the throttling of the hydraulic fluid through calibrated orifices for normal landing speeds, of the order of 3 m/s, allowing energy absorption upon impact.

Some of these prior-art devices also include valves equipped with throttling orifices having a variable section according to the compression rate or the direction of fluid passage, as well as braking means at the end of the expansion of the shock absorber, in order to make it more effective during the taxiing of the aerodyne on unprepared surfaces or slab-paved runways, or to absorb certain force peaks in order to absorb the effects of the resonance phenomenon on the ground exhibited on helicopters at the limit of lift just before take-off, and so that the device does not expand suddenly with a shock when it reaches the final expanded position.

These prior-art devices however are found to be unsuitable for emergency landings or crash landings with vertical speeds of the order of 10 to 12 m/s for example, for which the throttling orifices under compression are found to be under-dimensioned, so that the shock absorber behaves like an almost rigid element transmitting to the structure of the aircraft all the forces it receives, thereby damaging the aircraft, or the shock absorber which then leads to the damage of the aircraft.

There is also a prior-art shock absorber of this type in which the throttling orifice is determined by a piston traversed, with a definite clearance, by a rod carried by a rigid head mounted inside the rod and itself pierced with braking orifices for throttling the hydraulic fluid going from a chamber inside the rod toward a chamber inside the rigid head and separated from a high-pressure gas chamber by a separating piston.

With such a device and with similar devices having mobile heads pierced with throttling orifices, upon impact there is a combination of the forces due to the inertia of the unsuspended parts, such as the wheel and its equipment (brakes in particular) and the forces due to throttling which increase as the vertical speed upon impact increases, so that the total force undergone by the shock absorber is much greater than its yield point load and can exceed its ultimate load or the ultimate load of the shock absorber and bring about the destruction of the aircraft.

There are also prior-art shock absorber-actuators capable of bringing the landing gears either to the retracted position in flight, to the extended position for landing and taxiing as well as to an intermediate position on the ground to facilitate the placing of the aircraft in a hangar, access to certain components of the aircraft, its anchoring in the parking area, etc. These shock absorber-actuators comprise, for example, a shock absorber which may be of the type described above and which is mounted at the end of an actuator rod, a first chamber of which acts as a cylinder for the shock absorber, and itself integral with an actuator piston mounted slidably in an actuator cylinder, with which the piston defines a chamber controlling the lowering of the landing gear when it is supplied with hydraulic fluid and controlling its depressed position when it is empty without modifying the load of the shock absorber. In addition, a lifting piston mounted slidably in a second chamber of the rod of the actuator, separate from the first, and constituting a landing gear lifting chamber, makes it possible to load the shock absorber by pulling its rod toward the inside of the actuator rod when this second chamber is supplied with hydraulic fluid and when the lowering chamber is empty, thereby bringing the landing gear to the retracted position. A mechanical locking device, jaws for example, or a hydraulic device comprising a controlled-opening hydraulic locking valve is moreover provided to lock the actuator rod in the extended position in relation to the actuator cylinder after the filling of the lowering chamber. In the case of a hydraulic device, an overpressure valve placed at the bottom of the lowering chamber allows an extension of the stroke by the emptying of the lowering chamber in the event of a crash.

This solution however has the drawback that the best use is not made of the possible stroke of the shock absorber to absorb an additional part of the impact energy.

The problem which the present invention seeks to solve consists in designing improved shock absorbers and shock absorber-actuators capable of absorbing a fraction of the impact energy which may be three to four times greater than the maximum normal energy absorbed during normal landing speeds, this fraction of the impact energy itself being absorbed at speeds three to four times higher than the normal speeds, and the additional fraction of the impact energy being absorbed by the structure of the aircraft supporting the shock absorbers or shock absorber-actuators, the latter not being destroyed until after having used their entire compression stroke, whatever the vertical speed of the aircraft with respect to the ground, and the force experienced by the shock absorber remaining near the yield point load and in any case lower than the extreme load, the ultimate load of the landing gear or the shock absorber.

Shock absorbers meeting the characteristics described above have already been used, in particular by the applicant and have yielded good results. An example of a particular implementation is moreover given in reference to FIG. 1 in order to illustrate the prior art.

More precisely, the object of the present invention is to provide a shock absorber-actuator comprising:

a cylinder, a hollow rod defining a first space and sliding by means of a separating piston in said cylinder to define in said cylinder two variable volume chambers, a first chamber between said piston and a head of said cylinder, and a second annular chamber between the piston, the cylinder and said rod, and means for establishing communication between the first chamber and said space, characterized in that it comprises a separating piston capable of sliding in a sealed manner in said space to divide it into an upper part and a lower part, the upper part containing incompressible fluid and the lower part containing compressible fluid, means for defining a lower limit position of said separating piston in said space, and means for varying as desired the volume of incompressible fluid in said upper part.

Figure 2:
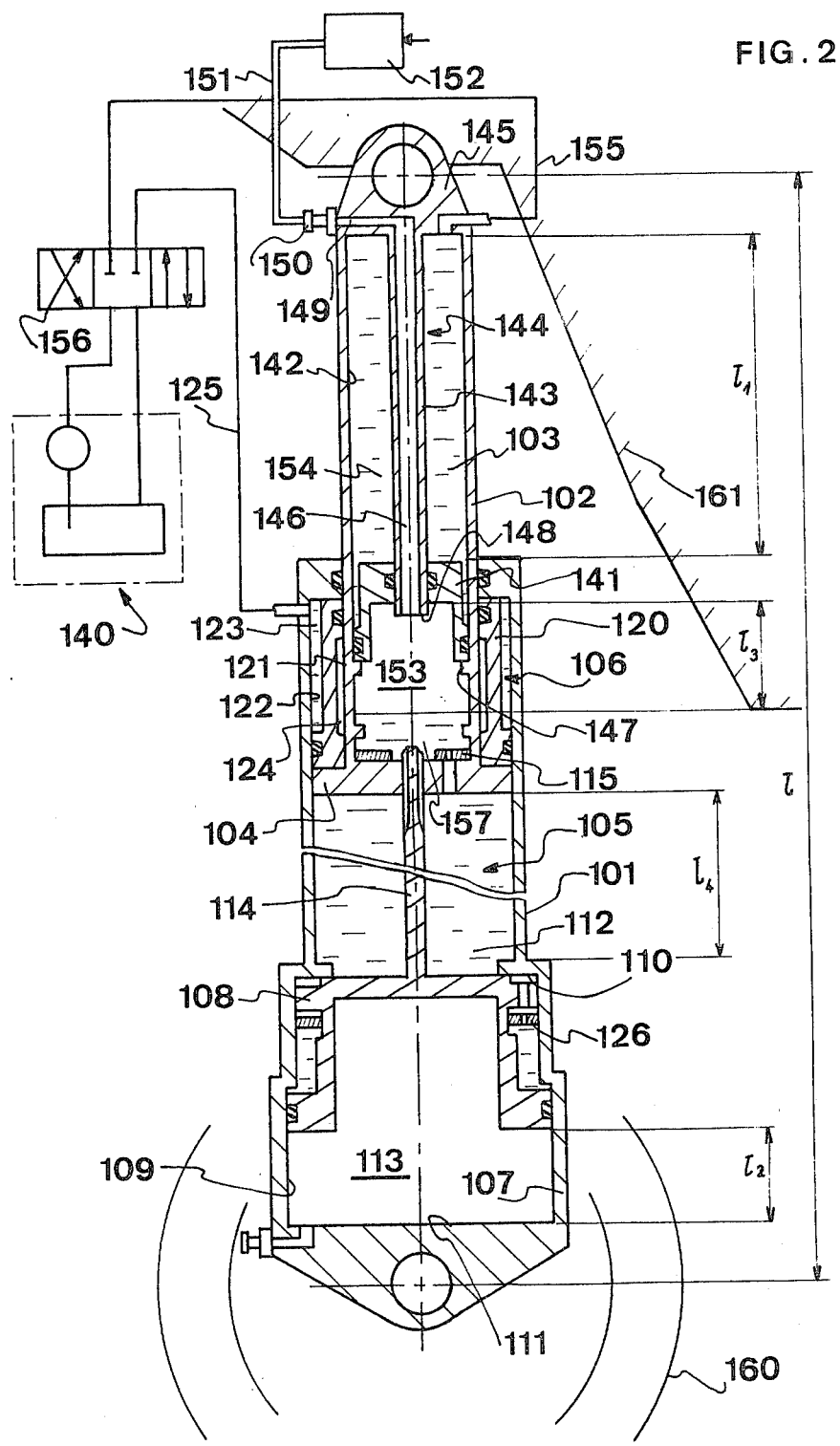

Other characteristics and advantages of the present invention will appear from the following description given with reference to the appended drawings in which FIG. 1 is provided to illustrate the prior art and the scope of the present invention according to the embodiment illustrated in FIG. 2.

Thus, FIG. 1 represents an embodiment of a shock absorber which, according to the knowledge of the applicant, should be the one which best illustrates the state of the art in the field of the invention.

The shock absorber includes a cylinder 1 in which slides a rod 2 of hollow design to delimit a space 3. This rod slides in the cylinder via a separating piston 4 making it possible to define in the cylinder a first lower chamber 5 under the piston and a second annular chamber 6 between the piston 4, the cylinder 1 and the rod 2.

As shown, the cylinder 1 has at its lower part 7 a mobile head 8 sliding in a sealed manner against the wall 9 but limited by two stops 10 and 11. The volume 12 over the mobile head 8 is filled with incompressible fluid such as oil and the volume 13 under the mobile head with an elastic medium forming a spring with a threshold consisting, for example, of a compressible fluid such as a gas under high pressure.

This mobile head has a counter-rod 14 having the form of a needle, which goes through the piston 4. This counter-rod 14 serves as a means of modulating the communication of the fluid between the volume 12 and the space 3 with, in a known manner, the throttling means represented schematically by valves 15.

To complete the description of this shock absorber, it is pointed out that the space 3 includes, over the volume of incompressible fluid 16, a volume of compressible fluid forming a spring 17. This compressible fluid, like a gas, can be introduced through a valve 18 and a line 19 located in the upper part of the rod 2, since this shock absorber embodiment is intended to be mounted on aircraft such as helicopters so that it is always substantially vertical and so that the rod is on top.

Furthermore, this type of shock absorber should be able to include suitable controllable means for reducing its length when, for example, the helicopter must be stored in hangars of reduced height, for example on aircraft carriers.

For this purpose, in the annular chamber 6 is placed a piston 20, called an actuator piston, capable of sliding againt the exterior wall 21 of the rod 2 and the interior wall 22 of the cylinder 1. This piston 20 delimits two spaces 23 and 24 in the chamber 6, the space 23 being capable of receiving fluid from an exterior source through the line 25.

The operation of this shock absorber is the following. As it is known, this operation will be reviewed very briefly.

It is first of all pointed out that the shock absorber is shown in its extended position. Beginning with this position:

(a) When the shock absorber is subjected to a normal shock, for example when the aircraft rolls on the runway, the rod 2 penetrates into the cylinder, oil passes relatively easily from the chamber 12 into the space 3 to compress the volume of gas 17 which dampens the shock in the manner of an elastic means. The rod comes back to its balanced position under the pressure of the compressed fluid but, in this case, with a throttling of the fluid which runs from the space 3 toward the chamber 12 in the valves 15.

(b) On the other hand, when the shock absorber is subjected to a large shock, for example during an emergency landing, almost all the impact pressure is transmitted to the mobile head which penetrates in opposition to the high-pressure chamber while damping a large part of the shock which then continues to be absorbed by the low-pressure chamber.

The shock absorber comes back to its balanced position slowly by the throttling of the fluid, as previously described, in the valves 15 at the level of the separating piston 4 and the valves 26 at the level of the mobile head 8.

(c) Finally, when the length of the shock absorber must be small, an underpressure control fluid, preferably incompressible, is sent into the space 23 through the line 25 so that the actuator piston 20 moves toward the separating piston 4 and tends to drive the rod into the cylinder until the volume of gas 17 undergoes maximum compression, so that the length of the shock absorber is at its minimum. As the total volume of oil in the rod and the cylinder does not vary, the minimum length that the shock absorber could reach if: 1 is its total extended length and $l_1$ and $l_2$ the height of the high and low pressure chambers, is in fact $1 - l_1$ if it is considered that generally $l_2$ does not vary owing to the high pressure prevailing in the chamber 13.

And, it may be desirable to reduce the overall length of this shock absorber even when it is not possible to reduce its length in the extended position owing to considerations relative, for example, to the attachment point and the wheel diameter.

The embodiment given in FIG. 2 makes it possible to deal to a great extent with the problem raised above.

FIG. 2 represents a shock absorber comprising a cylinder 101 in which slides a rod 102 designed hollow to delimit a space 103. This rod 102 slides in the cylinder by means of a separating piston 104 making it possible to define in the cylinder 101 a first lower chamber 105 located under the piston and a second annular chamber 106 between the piston 104, the cylinder 101 and the rod 102.

Furthermore, the cylinder 101 has at its lower part 107 a mobile head 108 with which are associated throttling means such as valves 126. This mobile head 108 slides in a sealed manner against the wall 109 between two mechanical stops represented by portions 110 and 111 of the internal wall of the cylinder 101.

Thus, the volume 112 over the mobile head 108 is filled with an incompressible fluid such as oil and the volume 113 under the mobile head is filled with an elastic medium acting as a spring with a threshold consisting for example of a compressible fluid such as a gas like nitrogen under high pressure.

This mobile head carries a counter-rod 114 having the form of a needle which goes through the piston 104.

This counter-rod 114 serves as a means of modulating the communication of fluid between the volume 112 and the space 103. Of course, the piston 104 also includes throttling means such as valves 115.

This shock absorber, which is intended more particularly for aircraft, helicopters for example, must also perform an actuator function to reduce its length when, for example, the helicopter must be stored in hangars of reduced height, as on aircraft carriers.

For this purpose, the annular chamber 106 contains an actuator piston 120 capable of sliding in a sealed manner against the external wall 121 of the rod 102, on the one hand, and against the internal wall 122 of the cylinder 101 on the other hand.

This piston 120 divides this chamber into two spaces 123 and 124, and the space 123 can be supplied by a source of fluid 140 through the line 125.

In this particular embodiment, what has just been described is found in prior-art embodiments. On the other hand, it is noted that in the space 103 slides a separating piston 141, on the one hand, against the internal wall 142 of the rod 102 and, on the other hand, against the external wall 143 of a central guide 144 fixed on the upper head 145 of the rod 102. Furthermore, this guide includes a central channel 146 which leads out, on one end 148, always under the piston 141 whose lower limit position is perfectly defined by mechanical stops 147 and, on its other end 149, outside of the rod 102 through a valve 150 which can be connected by a line 151 to a source of controllable compressible fluid 152 as will be explained below.

Consequently, the separating piston 141 delimits in the space 103 two volumes 153 and 154 and it can move by sliding in particular along the guide 144 between the stop 147 and the head 145 of the rod 102.

The volume 154 can be connected via a line 155 also to an incompressible fluid source, for example the same source 140 supplying the space 123 mentioned above. On the other hand, in this case, the space 123 and the volume 154 are connected respectively to the source 140 through a controllable distributor 156. This distributor is used essentially to fill the space 123 while allowing the emptying of the volume 154, to empty the space 123 while allowing the filling of the volume 154, or finally to close off the two lines 125 and 155 to maintain the amount of fluid in the space 123 and the volume 154. In general, this distributor makes it possible to synchronize the controls for moving the two pistons 120 and 141 respectively.

Finally, it is pointed out that the guide 144 is located on the same displacement axis as the needle 114, and the channel 146 has a larger diameter than the exterior diameter of the needle 114. Thus, when the rod 102 penetrates into the cylinder 101, the needle 114 penetrates into the channel 146 and hence neither prevents nor limits this displacement.

Finally, the volume 153 has, at the bottom, when the shock absorber is in the extended position, a small amount of fluid 157 over which there is an amount of elastic compressible fluid acting as a spring, for example a gas such as nitrogen, at a relatively low pressure in relation to that of the volume 113.

Finally, the rod and the cylinder are placed so that they are always substantially in a vertical position and the rod is in an upper position as shown in the Figure in which is shown schematically a wheel 160 connected to the cylinder 101 and the structure 161 of the aircraft on which is fixed the end 145 of the rod 102, and in which are located the fluidic supply elements such as the sources 140 and 152 and the distributor 156.

The operation of this shock absorber is described below.

First of all, as concerns the absorption of relatively light and heavy shocks, this shock absorber operates in the same manner as that of the prior art previously described. Consequently, its operation in these two cases will not be developed here. On the other hand, when the length of the shock absorber can be reduced, its operation is the following:

For a control of the distributor 156, simultaneously the space 123 is supplied with fluid under pressure and the volume 154 is connected to the supply inlet from the source 140. Hence, the actuator piston 120 pushes on the piston 104 and causes the rod 102 to penetrate into the cylinder 101. The separating piston 141 rises up into the rod 102 while emptying the volume of fluid 154, with the needle 114 penetrating into the channel 146. If the fluid supply pressure is sufficient, the length of the shock absorber will be reduced to a maximum when the fluid in volume 154 has been completely emptied and at least the volume 153 of the compressible fluid has been compressed to the maximum.

In this case, examining the same hypotheses as for the shock absorber according to the prior art, i.e. taking 1 to be the totally extended length, $l_1$ the height of compressible fluid in volume 153 and $l_3$ the height of the fluid in volume 154, the mechanical part of the shock absorber will be compressed to obtain a height equal to: $1 - l_1 + l_3$.

Hence, all things considered, it is possible to reduce the length of this shock absorber by an additional value equal to $l_3$, which is considerable, particularly under the conditions described earlier for aircraft carriers for example, it being assumed that length $l_4$ is greater than length $l_3$ as is generally the case.

I claim:
1. Shock absorber-actuator comprising:
   a cylinder 101,
   a hollow rod 102 defining a first space 103 and sliding by means of a first separating piston 104 in said cylinder to define in said cylinder two variable volume chambers, a first chamber 105 between said first separating piston 104 and one head of said cylinder 101, and a second annular chamber 106 between the first separating piston, the cylinder 101 and said rod 102, and means for establishing communication between the first chamber 105 and said space 103, a second separating piston 141 capable of sliding in a sealed manner in said space 103 to divide said space into an upper part 154 and a lower part 153, the upper part 154 containing an compressible fluid and the lower part 153 containing compressible fluid, means 147 defining a lower limit position for said second separating piston 141 in said space 103, and means 140, 156, 155 for varying as desired the volume of incompressible fluid in said upper part 154.

2. Shock absorber according to claim 1, wherein said space 103 includes a central guide 144 around which said second separating piston 141 slides in a sealed manner, said central guide 144 comprising a line 151 leading, on one end, into said lower part 153 containing compressible fluid and, on its other end, outside of said rod 102, comprising means 150 for connecting said line 151 to a source of compressible fluid 152.

3. Shock absorber according to claim 2, wherein said means for putting said first chamber 105 into communication with said space 103 include a counter-rod 114 integral with a mobile head 108, said counter-rod 114 cooperating with an orifice going through said first separating piston 104, said counter-rod 114 terminating in a needle, and said line of said guide 114 being capable of sliding onto said needle when said rod 102 penetrates into said cylinder 101.

4. Shock absorber according to claim 3, wherein said counter-rod 114 integral with said mobile head 108 slides in said cylinder 101 in opposition to an elastic means with a force threshold.

5. Shock absorber according to claim 1, further comprising an annular actuator piston 120 located in said second annular chamber 106, said annular actuator piston 120 cooperating with the interior wall 122 of the cylinder 101 and the exterior wall 121 of said rod 102 to divide said annular chamber 106 into two portions, means 140, 156, 125 for supplying control fluid to one 123 of the two portions so as to move said actuator piston 120 against said first separating piston 104 and thereby tend to displace piston 104 to cause said rod 102 to penetrate into said cylinder 101.

6. Shock absorber according to claim 5, wherein said means for supplying control fluid to one of the two portions and said means for varying as desired the volume of the incompressible fluid in the upper part 154 include synchronization means 156 to obtain the emptying of said upper part 154 when said actuator piston 120 is controlled to cause said rod 102 to penetrate into said cylinder 101.

* * * * *